United States Patent [19]

Stacy

[11] Patent Number: 5,644,337
[45] Date of Patent: Jul. 1, 1997

[54] TRACKBALL HAVING SINGLE EMITTER-DETECTOR DETECTING CHOPPER WHEEL DIRECTION

[75] Inventor: Carl W. Stacy, Elmwood Park, Ill.

[73] Assignee: Zenith Electronics Corporation, Glenview, Ill.

[21] Appl. No.: 467,424

[22] Filed: Jun. 6, 1995

[51] Int. Cl.$^6$ .................................................. G06F 3/033
[52] U.S. Cl. ........................................... 345/167; 345/166
[58] Field of Search ............................. 345/166, 165, 345/164, 163, 167; 356/446; 250/227.21, 233

[56] References Cited

U.S. PATENT DOCUMENTS

| | | | |
|---|---|---|---|
| 4,814,553 | 3/1989 | Joyce | 345/166 X |
| 4,899,053 | 2/1990 | Lai et al. | 250/343 |
| 5,090,812 | 2/1992 | Jungwirth | 356/446 |
| 5,384,460 | 1/1995 | Tseng | 345/166 X |
| 5,446,481 | 8/1995 | Gillick et al. | 345/163 |
| 5,457,479 | 10/1995 | Cheng | 345/163 |
| 5,486,925 | 1/1996 | Sano et al. | 345/163 |
| 5,517,211 | 5/1996 | Kwang-Chen | 345/166 |

Primary Examiner—Mark R. Powell

[57] ABSTRACT

A simplified trackball arrangement utilizes a single IR emitter-detector combination for determining the distance and direction of movement of a chopper wheel. The chopper wheel has a plurality of slots for interrupting the infrared path between the emitter-detector combination. The distance travelled by the trackball is a function of the number of slots interrupting the emitter-detector combination IR path. The slots are arranged in a distinctive 1-2-3 pattern such that the direction of rotation may be determined by a pattern detector sensing a 1-2-3 or a 3-2-1 pattern to the IR beam interruptions.

7 Claims, 1 Drawing Sheet

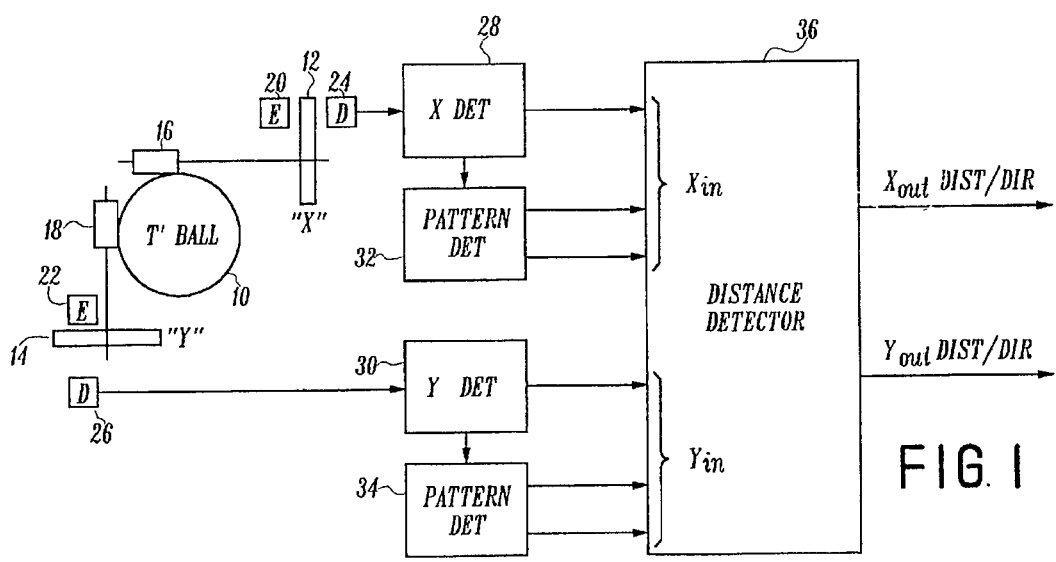
FIG. 1
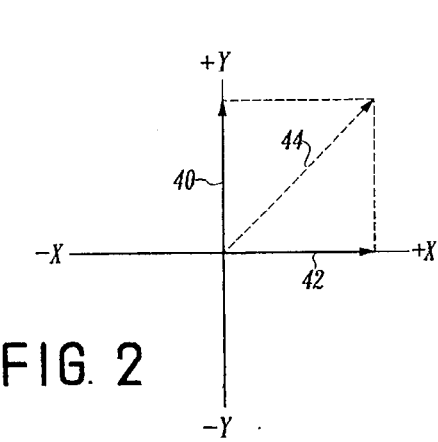
FIG. 2
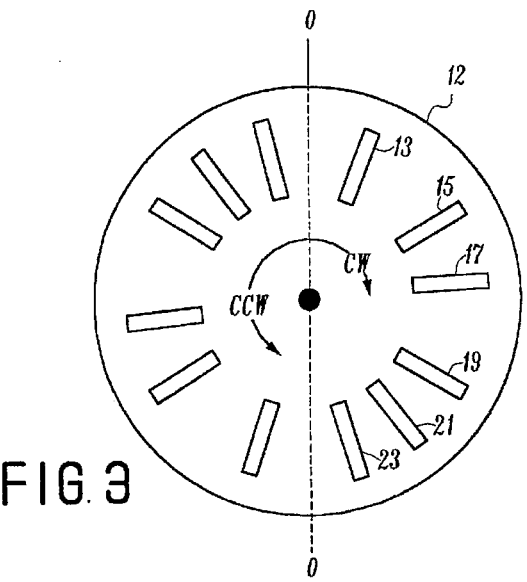
FIG. 3
FIG. 4
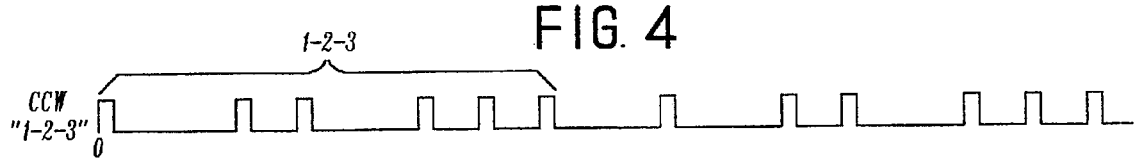
FIG. 5
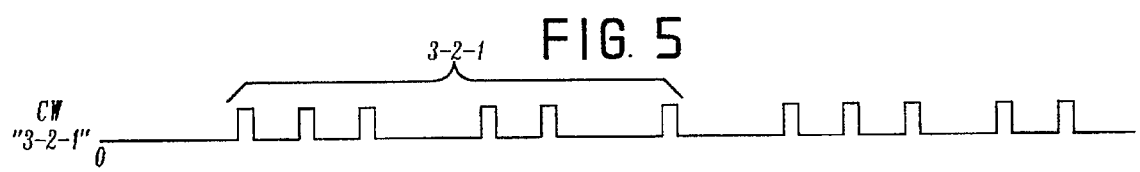

TRACKBALL HAVING SINGLE EMITTER-DETECTOR DETECTING CHOPPER WHEEL DIRECTION

BACKGROUND OF THE INVENTION AND PRIOR ART

This invention relates in general to trackballs and in particular to a simplified trackball arrangement that requires a single emitter-detector combination for each chopper wheel as compared to the emitter and two detectors for the prior art chopper wheels.

Trackball arrangements are well known in the art for conveying information regarding the distance and direction of movement of a ball over a surface. These arrangements are commonly used in computer "mouses" and for other similar type operations where x-y movements are to be determined. Conventional trackball mechanisms include a trackball that is drivingly engageable with a pair of rollers, each of which, in turn, drives a respective chopper wheel. The chopper wheel comprises a disk that has a plurality of evenly spaced slots about its periphery. The slotted chopper wheel interrupts an infrared (IR) beam that is formed by an IR emitter and detected by an IR detector that are positioned on opposite sides of the chopper wheel. The distance travelled by the trackball is determined by the number of slots passing between the emitter-detector combination. A second detector that responds to the same IR beam from the emitter of the emitter-detector combination is used to determine the direction of movement of the chopper wheel. The outputs from the IR detectors (for both the X and the Y chopper wheels) are integrated to provide a resultant directional movement indication for use by the computer or other output device.

With the invention, one of the IR detectors for each chopper wheel is eliminated thus simplifying the trackball structure and lowering its cost.

OBJECT OF THE INVENTION

A principal object of the invention is to provide a novel trackball mechanism.

Another object of the invention is to provide an improved trackball mechanism.

A further object of the invention is to provide a simplified, cost effective trackball mechanism.

BRIEF DESCRIPTION OF THE DRAWINGS

These and other objects and advantages of the invention will be apparent upon reading the following description in conjunction with the drawings, in which:

FIG. 1 is a simplified showing of a trackball arrangement illustrating the invention;

FIG. 2 indicates the development of a resultant movement responsive to X-Y trackball movements;

FIG. 3 is a plan view of a chopper wheel showing a distinctive slot pattern in accordance with the invention;

FIG. 4 is a detected pulse pattern developed from the chopper wheel of FIG. 3 for a counterclockwise direction of rotation; and FIG. 5 is a similar detected pulse pattern developed for a clockwise direction of rotation of the chopper wheel of FIG. 3.

DESCRIPTION OF THE PREFERRED EMBODIMENT

Referring to FIG. 1, a trackball 10 is shown in conjunction with an X chopper wheel 12 and a Y chopper wheel 14 that are respectively driven by a roller 16 and a roller 18 positioned at right angles to each other and each engageable with the periphery of trackball 10. Two IR emitters 20 and 22 are positioned on one side of each of the chopper wheels 12 and 14 and two corresponding IR detectors 24 and 26 are positioned on the other side thereof in position to receive the IR beams emitter by their associated IR emitters. The output of IR detector 24 is coupled to an X detector 28 and the output of IR detector 26 is coupled to a Y detector 30. A pair of pattern detectors 32 and 34 are respectively supplied with the signals developed by the X and Y detectors 28 and 30, respectively. All of the detectors 28, 32, 30 and 34 supply $X_{in}$ and $Y_{in}$ inputs to a distance detector 36 where the X-Y coordinates $X_{out}$ and $Y_{out}$ developed. The $X_{out}$ and $Y_{out}$ coordinates include not only the X-Y distance information, but also directional information, i.e. whether the movements are along the +X, +Y, −X or −Y axes.

FIG. 2 illustrates the conventional +X, −X, +Y and −Y coordinate axes. Solid arrow 40 is in the +Y direction and solid arrow 42 is in the +X direction which produces a resultant dashed line arrow 44. For the arrangement of FIG. 1, an output 42 along the +X axis and an output 40 along the +Y axis would result in a resultant output 44 indicating the corresponding distance and direction of movement of trackball 10.

In FIG. 3, the X chopper wheel 12 is shown in plan view. A plurality of slots 13, 15, 17, 19, 21 and 23, are formed around the periphery of chopper wheel 12 with a spacing that will produce a pattern that will enable identification of the angular direction of rotation of the chopper wheel. Reversed rotation will produce an opposite pattern and therefore the rotational movement of the chopper wheel, i.e. whether clockwise or counterclockwise may readily be determined. As briefly discussed in connection with the prior art, the direction of rotation of prior art chopper wheels is determined by using two detectors and noting the order in which the pulses from the two detectors occur. For example, the pulse from detector A will occur before the pulse from detector B for one rotational direction and vice versa for the other rotational direction. With the invention, the pattern of the pulse output from the single detector indicates the direction of the rotation of the chopper wheel. It will be appreciated that while the positions of the slots 13–23 correspond to 10 degree angles about the chopper wheel, the number of slots and angles therebetween is a matter of design choice. In practice, the use of 12 slots and the illustrated patterns for a trackball controller for a television receiver has proven effective. The number of slots in the chopper wheel is chosen with regard to the trackball movement so that a sufficient number of the slots interrupt the IR path of the emitter-detector combination over the range of normal movement of the trackball.

FIGS. 4 and 5 generally represent the pulse patterns obtained from the chopper wheel of FIG. 3 for a counter-clockwise direction of rotation and a clockwise direction of rotation, respectively. In FIG. 4, the pattern is a 1 pulse, 2 pulse, 3 pulse sequence, whereas in FIG. 5, the pulse sequence is 3, 2, 1. It will be appreciated that this simple pattern may be readily detected to determine the direction of rotation of the chopper wheel. Further, the distance traveled by the trackball, which is a function of the number of slots that interrupt the IR path between the emitter-detector combination, is determined by integrating the pulses and the loss of accuracy, because of the spacing, is not of significant consequence. The use of a single detector therefore results in a cost advantage to the mechanism in addition to a mechanical simplification.

What has been described is a simplified trackball arrangement that uses a single emitter-detector combination for each of the X and Y axes chopper wheels. It is recognized that numerous changes in the described embodiment of the invention will be apparent to those skilled in the art without departing from its true spirit and scope. The invention is to be limited only as defined in the claims.

What is claimed is:

1. In combination:

a trackball;

a chopper wheel arranged in a driving relationship with said trackball;

a directional slot pattern on said chopper wheel;

an IR emitter-detector sensing movement of said chopper wheel; and pattern detection means responsive to said directional slot pattern for determining the direction of movement of said chopper wheel.

2. The combination of claim 1 wherein said chopper wheel has a distinctive sequence of slots for distinguishing between clockwise and counterclockwise rotation of said chopper wheel.

3. The combination of claim 2 wherein said distinctive sequence comprises spaced groupings of different numbers of said slots.

4. The combination of claim 3 wherein said spaced grouping form a distinctive 3, 2, 1 slot pattern for one direction of movement of the chopper wheel and a 1, 2, 3 pattern for the opposite direction of movement.

5. In combination:

a trackball;

a pair of chopper wheels arranged in a driving relationship with said trackball;

a distinctive slot pattern comprising spaced groupings of different numbers of slots on each of said chopper wheels;

two-emitter-detector combinations for sensing movements of said chopper wheels, respectively; and pattern detection means responsive to said spaced groupings of different numbers of slots for determining the direction of said movements of said chopper wheels.

6. The combination of claim 5 wherein said spaced groupings form a 3, 2, 1 pattern for one direction of chopper wheel movement and a 1, 2, 3 pattern for the opposite direction of chopper wheel movement.

7. A trackball mechanism for producing a directional output based upon rotational movement of a trackball comprising:

a trackball mounted for rotational movement;

a pair of X and Y rollers drivingly engaging said trackball;

a pair of chopper wheels respectively driven by said X and Y rollers;

an emitter-detector combination positioned with respect to each of said chopper wheels for detecting movement thereof, said chopper wheels each having a distinctive pattern comprising a sequence of a plurality of slots for making and breaking the infrared paths between said emitter-detector combinations responsive to movement of said chopper wheels;

distance detection means for determining the distance traveled by said trackball based upon slot movement between said emitter-detector combinations; and pattern detection means coupled to said distance detection means for determining the rotational direction of movement of said chopper wheels based from said distinctive pattern of said slots.

* * * * *